United States Patent [19]

Umeda et al.

[11] Patent Number: 5,442,608
[45] Date of Patent: Aug. 15, 1995

[54] DISK APPARATUS HAVING A POWER CONSUMPTION REDUCING MECHANISM

[75] Inventors: Yoshiaki Umeda; Teruo Furukawa; Masaharu Ogawa; Kazuhiko Nakane, all of Amagasaki; Akira Mashimo, Musashino; Tetsuro Araki, Musashino; Hiroyuki Onda, Musashino; Yoshiaki Sakai, Musashino; Hiroshi Tsuyuguchi, Musashino; Katsuya Enami, Musashino, all of Japan

[73] Assignees: Mitsubishi Electric Corp; TEAC Corporation, both of Japan

[21] Appl. No.: 206,900

[22] Filed: Mar. 4, 1994

Related U.S. Application Data

[63] Continuation of Ser. No. 731,500, Jul. 17, 1991, abandoned.

[30] Foreign Application Priority Data

Jul. 19, 1990 [JP] Japan .................................. 2-191292

[51] Int. Cl.[6] .............................................. G11B 7/00
[52] U.S. Cl. ..................... 369/44.27; 369/47; 369/48; 369/124
[58] Field of Search ..................... 369/44.27, 44.11, 47, 369/48, 53, 54, 32, 124, 58

[56] References Cited

U.S. PATENT DOCUMENTS

| | | | |
|---|---|---|---|
| 4,894,814 | 1/1990 | Yamada et al. | 369/32 |
| 4,916,682 | 4/1990 | Tomoda et al. | 369/32 |
| 4,972,399 | 11/1990 | Miyasaka | 369/44.27 |
| 5,060,208 | 10/1991 | Nagai et al. | 369/124 |

Primary Examiner—Georgia Y. Epps
Assistant Examiner—Muhammad N. Edun
Attorney, Agent, or Firm—Andrus, Sceales, Starke & Sawall

[57] ABSTRACT

A disk apparatus comprising a controller receiving commands from a command input device and controlling an entire operation of the disk apparatus. The rotating control function is coupled to the controller for controlling the first motor. The pickupmotor control function is coupled to the controller for controlling the second motor. The pickup control function is coupled to the controller for controlling a focusing operation and a tracking operation of the pickup. And the signal processing function is coupled to the controller for processing a recording signal to be recorded on the disk-shaped recording medium and a reproduced signal read out therefrom. The controller is comprised function-stop function for determining whether or not any command is received from the command input device during a predetermined period of time in a state. The disk apparatus is maintained in a predetermined mode and for stopping predetermined function among the rotating control function, the pickup motor control function, the pickup control function, and the signal processing function when it is determined that no command is received from the command input device during the predetermined period.

16 Claims, 4 Drawing Sheets

DISK APPARATUS HAVING A POWER CONSUMPTION REDUCING MECHANISM

The present application is a continuation application of U.S. patent application, Ser. No. 07/731,500, filed Jul. 17, 1991, and now abandoned.

BACKGROUND OF THE INVENTION

The present invention relates to a disk apparatus, and more particularly, a disk apparatus which simultaneously operates a plurality of functions for recording and reproducing.

Conventionally, it is required that a disk apparatus consume a small amount of power and generate a small amount of heat. A magneto-optic disk drive satisfies this requirement and is used as a back-up memory for a computer.

A conventional magneto-optic disk drive is comprised of a disk motor, a controller, an optical pickup, an actuator movement motor, a magnetic field generation function means, and a motor control system, and is controlled by commands of a host computer. The disk motor rotates a magneto-optic disk. The controller controls each function of the disk apparatus, and the optical pickup shapes a laser beam.

Such a conventional disk apparatus is operated in any of the following three states: first, the apparatus operates only at its interface with the host computer; second, the disk motor and focusing and tracking servomechanism are operated to record and reproduce; and lastly, the disk motor and focusing and tracking servomechanism are operated, but are on stand-by because no command for recording and reproducing is entered. Each of the above operating states is controlled by commands given by the host computer by way of the controller to shift from one operating state to another.

Generally speaking, from the view point of power consumption, the disk apparatus of a conventional type consumes power when all the functions work, and does not do so when all the functions are on stand-by. It should be noted that when the apparatus is on stand-by, the disk motor and focusing and tracking servomechanism are operated and thus, the disk drive consumes power. In such a case, power is consumed even if no recording or reproducing is carried out, and large average power is consumed. Also, the temperature will rise due to heat generated in the apparatus.

SUMMARY OF THE INVENTION

Accordingly, a general object of the present invention is to provide a new and useful disk apparatus in which the above-mentioned problems are eliminated.

A more specific object of the present invention is to provide a disk apparatus which has lower average power consumption and heat generation ratios.

These objects of the present invention are achieved by a disk apparatus having a first motor for rotating a disk-shaped recording medium, a pickup, and a second motor for moving the pickup in radial directions of the disk-shaped recording medium, the disk apparatus comprising:

a controller receiving commands from a command input device and controlling an entire operation of the disk apparatus;

rotating control means, coupled to the controller, for controlling the first motor;

pickupmotor control means, coupled to the controller, for controlling the second motor;

pickup control means, coupled to the controller, for controlling a focusing operation and a tracking operation of the pickup; and signal processing means, coupled to the controller, for processing a recording signal to be recorded on the disk-shaped recording medium and a reproduced signal read out therefrom, the controller comprising function stop means for determining whether or not any command is received from the command input device during a predetermined period of time in a state where the disk apparatus is maintained in a predetermined mode and for stopping predetermined means among the rotating control means, the pickup motor control means, the pickup control means and the signal processing means when it is determined that no command is received from the command input device during said predetermined period.

DESCRIPTION OF THE PREFERRED EMBODIMENTS

Figure 1:
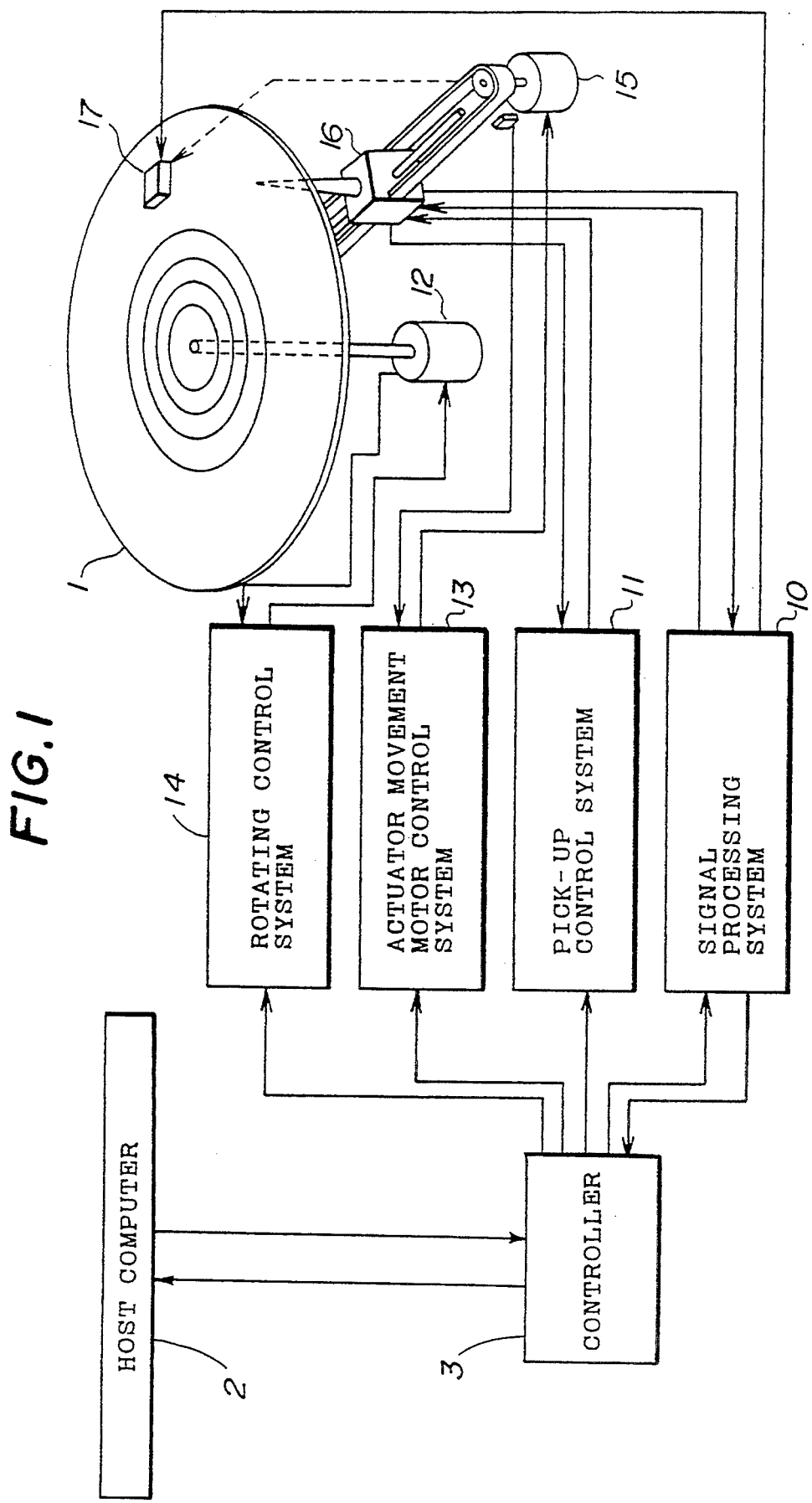
FIG. 1 is a block diagram of a first embodiment of the present invention.

FIG. 1 is a block diagram of a configuration of a first embodiment according to the present invention. The magneto-optic disk apparatus of the first embodiment is composed of a magneto-optic disk 1, a controller 3, a signal processing system 10, a pickup control system 11, a motor 12, an actuator movement motor control system 13, a rotating control system 12, an actuator movement motor 15, a pickup 16, and a magnetic field generating means 17.

The magneto-optic disk 1 is a recording medium for recording and reproducing of information by a laser beam and magnetic force. The magneto-optic disk 1 is put in a cartridge, and the cartridge is attached in place in the disk apparatus. The attachment/detachment of such a cartridge is carried out with a loading mechanism (not shown for the sake of simplicity).

The host computer 2 is connected to the controller 3, and gives operating commands by way of the controller 3 by inputting control commands to control each system. According to the present invention commands to be given by the host computer 2 include an operation command, a stop command, a start command and an eject command. The controller 3 is connected to the host computer 2, the signal processing system 10, the pickup control system 11, the actuator movement motor control system 13, and the rotating control system 12. The controller 3 controls each system as regards to operation and stop functions in response to commands from the host computer 2. That is, the signal processing system 10, pickup control system 11, actuator movement control system 13 and rotating control system 14, each connected to the controller 3, are controlled in response to signals from the controller 3.

The signal processing system 10 is connected to a light emission element which is a light source (not shown), a pickup 16 having a light sensor (not shown), and the magnetic field generating function means 17. The signal processing system 10 controls recording on the magneto-optic disk 1 by the magnetic field generating function means 17. The signal processing system 10 also processes signals for recording and reproducing by way of the pickup 16. The pickup control system 11, when an operating signal is supplied to it from the controller 3, controls an actuator (not shown) of the pickup 16, and it also controls focusing and tracking. The actuator movement motor control system 13 drives the actuator movement motor 15 and controls the pickup 16. The rotating control system 11 drives the motor 12 and rotates the magneto-optic disk 1. The pickup 16 is provided with the actuator to focus a laser beam onto the magneto-optic disk 1 and trace a prescribed track. The magnetic field generating function means 17 is provided in a position opposite to that of the pickup 16, the magneto-optic disk 1 being between them.

Accordingly, when the host computer 2 supplies the controller 3 with operating commands, the controller 3 supplies control signals to the signal processing system 10, the pickup control system 11, the actuator movement motor control system 13 and the rotating control system 14, each connected to the controller 3, and each control system operates in response to these signals from the controller 3. The signals processed in the signal processing system 10 are supplied to the host computer 2 by way of the controller 3.

Figure 2:
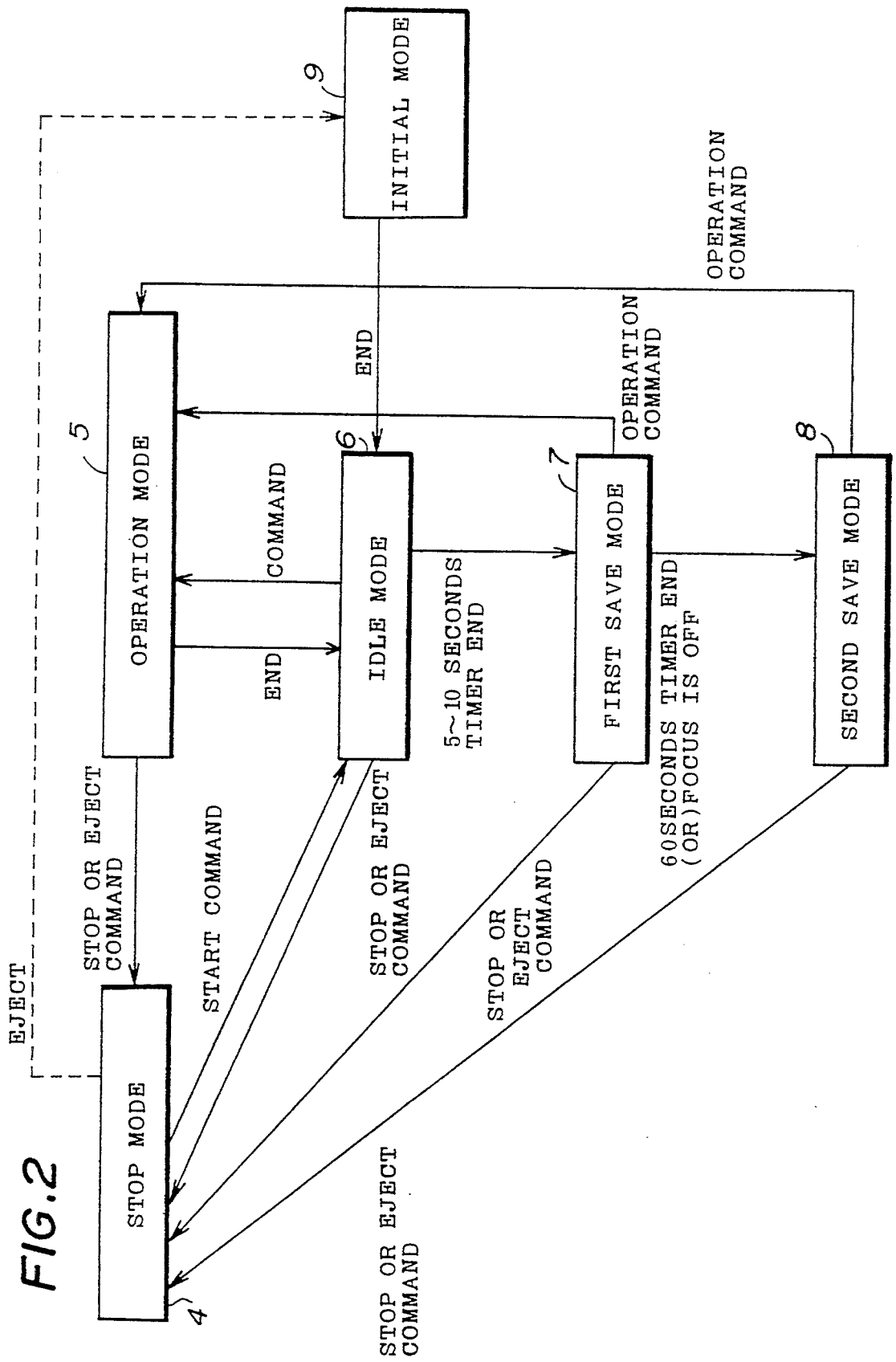
FIG. 2 is a flow chart of operations controlled by the controller of the first embodiment of the present invention.

FIG. 2 is an illustration of the disk apparatus modes of the present invention. The modes of the present invention include a stop mode 4, an operation mode 5, an idle mode 6, a first save mode 7, a second save mode 8, and an initial mode 9. Operating commands from the host computer 2 are executed in any of these modes by way of the controller 3.

The operation mode 5 executes some operating commands of a small computer system interface (SCSI). The idle mode 6 performs focusing and tracking, and traces the same track. But this mode enables the track to be traced at the time the operation mode is completed. The idle mode 6 operates when the initial mode 9 is completed, and the operation mode 5 terminates and a start command is inputted in the stop mode 4.

The initial mode 9 is used to initialize the disk apparatus. This mode confirms that power goes on, and the disk 1 is set in place in the disk apparatus. This mode prepares the disk apparatus for operation and reads the information area of the disk medium in the disk apparatus.

The power save modes for reducing power consumption are the stop mode 4, the first save mode 7 and the second save mode 8. The stop mode 1 is such that only the SCSI interfacing with the host computer 2 operates. When the host computer 2 gives a start command to the controller 3, the disk apparatus moves to the idle mode 6. If an eject command is given to eject the disk 1, the controller 3 operates to eject it. Power consumption at the stop mode 1 amounts to approximately 1 W, approximately 7 W in the idle mode 6, and approximately 10 W in the operation mode 5.

In the first save mode 7, if applied, the disk motor 12 revolves and the focus servomechanism is operated, power consumption therein being approximately 5 W. When an operation command is input in the controller 3 from the host computer 2, the tracking servomechanism is put into operation, and the mode shifts to the operation mode 5. When a stop command is input in the controller 3, it shifts the operation mode 5 to the stop mode 4.

In the second save mode 8, if applied, the disk motor 12 revolves to rotates the disk 1, power consumption therein being approximately 2.5 W. These power save modes reduce power consumption to allow the disk apparatus to be on stand-by when the host computer 2 does not output any command for a long period of time. The first save mode 7 and the second save mode 8 consume less power than the other modes, so power consumption may be reduced if the operation mode 5 shifts to the first save mode 7 or the second save mode 8 when the host computer 2 does not output any signal for a long period of time.

The description that follows shows how the disk apparatus shifts from the operation mode 5 to any of the other modes, including the power save modes. The shifting of modes is performed by the host computer 2 inputting each SCSI command to the controller 3, the controller 3 controlling the shifting of each mode. When a stop command is inputted, the disk apparatus will shift from the operation mode 5 to the stop mode 4. When a start command is inputted, the disk apparatus will shift from the stop mode 1 to the idle mode 6. When the operation mode 5 is over, the disk apparatus shifts from the operation mode 5 to the idle mode 6 once. If the idle mode 6 lasts longer than the prescribed time (5 to 10 seconds), it will shift from the idle mode 6 to the first save mode 7. To shift from the operation mode 5 to the second save mode 8, the disk apparatus shifts by way of the idle mode 6 and the first save mode 7. However, this happens only when no SCSI command is inputted within 60 seconds after the disk apparatus shifts to the first save mode 7. The tracking servomechanism does not operate in the first save mode 7, so the focus servomechanism is in a state where it is less resistant to vibration shock, and it may be in the wrong position. If the focus servomechanism is in the wrong position, the disk apparatus will shift to the second save mode 8.

When an SCSI command in the controller 3 is inputted from the host computer 2 when the disk apparatus is in the idle mode 6, the first power save mode 7 or the second power save mode 8, it will shift to the operation mode 5.

Figure 3:
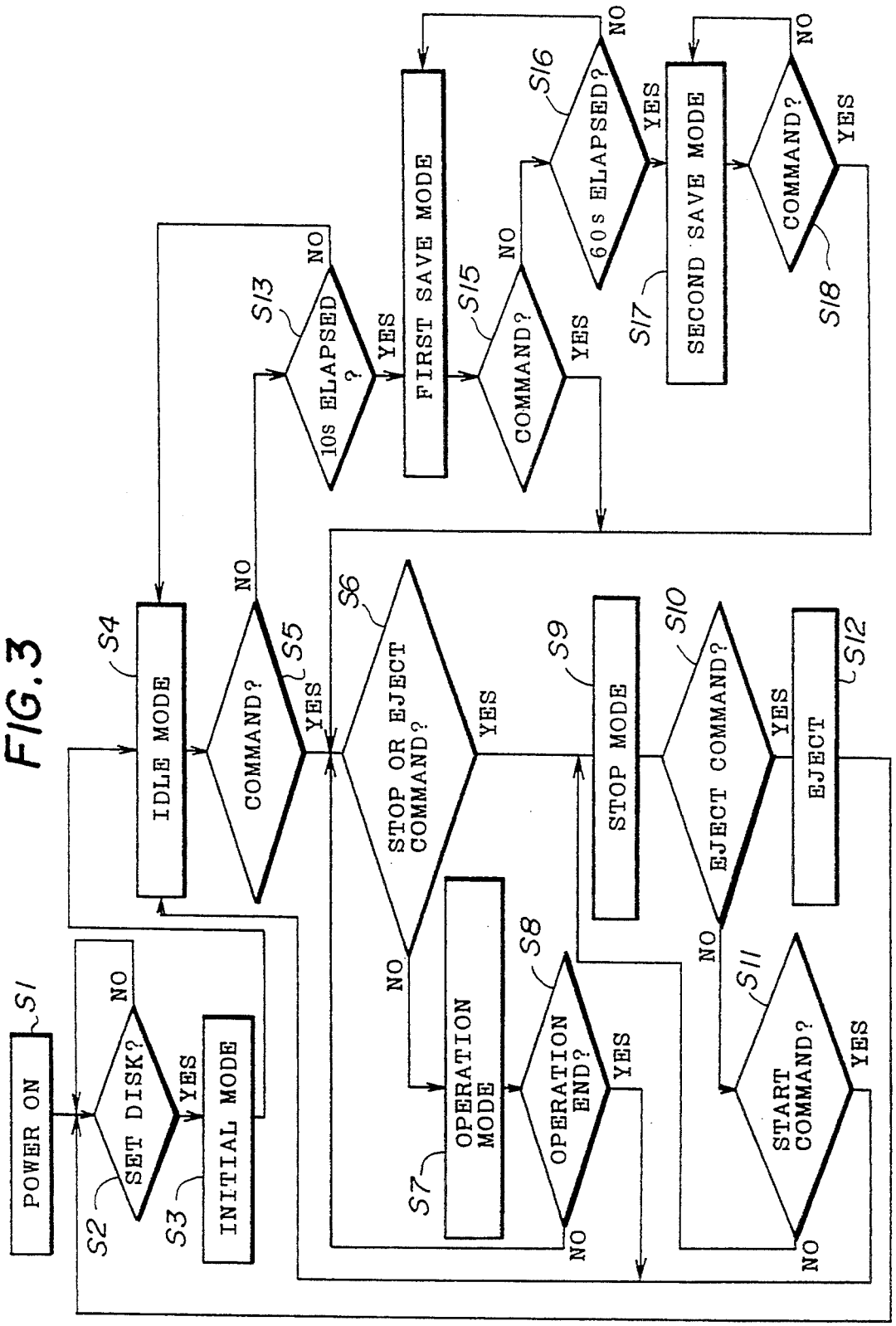
FIG. 3 is a flowchart of the operating of the first embodiment of the present invention.

FIG. 3 is a flow chart of the operations under the control of the controller of the first embodiment of the present invention.

Step 1: The operator supplies power to the disk apparatus.

Step 2: When the disk cartridge containing the disk 1 is inserted in the disk apparatus, the controller 3 sets the disk 1 in a position in the disk apparatus, using the loading mechanism (not shown).

Step 3: When the controller 3 supplies operating signals to the signal processing system 10, the pickup control system 11, the actuator movement motor control system 13, and the rotating control system 11, the disk apparatus executes the initial mode 9.

Step 4: When the initial mode 9 is over, the controller 3 controls so that the disk apparatus is prepared for operating in the idle mode 6.

Step 5: If no command is given to the controller 3 from the host computer 2 when the disk apparatus is in the idle mode 6 as described in Step 4, the process of the disk apparatus operation moves to Step 13.

Step 6: When a command is given to the controller 3 from the host computer 2 in Step 5, the controller 3 determines if the command is the stop command or the eject command.

Step 7: If a command other than the stop command or the eject command is given in Step 6, the operation mode 5 (FIG. 2) is executed.

Step 8: When the operation mode 5 is completed, it shifts to the idle mode 6 (shifting to Step 2). If the operation is not over, the disk apparatus moves to Step 6.

Step 9: When a stop command is given to the controller from the host computer 2 in Step 6, the controller 3 sends signals to and receives signals from the host computer 2 only, thus putting the disk apparatus in the stop mode 4 in which the disk 1 stops rotating, and focusing and tracking are stopped.

Step 10: If the host computer 2 gives the eject command to the controller 3 to eject the disk 1 from the disk apparatus in Step 6, the disk apparatus moves to step 12.

Step 11: If the host computer 2 gives the start command to the controller 3 in Step 10, the controller 3 shifts the disk apparatus to the idle mode 6. If the input command is other than the stop command or an eject command, the disk apparatus moves to Step 9.

Step 12: When the eject command is inputted in the controller 3 from the host computer 2 in Step 10, the disk apparatus is controlled so as to eject the disk 1 by the controller 3.

Step 13: If no command is given to the controller 3 from the host computer 2 in the idle mode 6 longer than the prescribed time (10 seconds) in Step 5, the controller 3 moves to Step 14. The disk apparatus remains in the idle mode 6 during the prescribed time.

Step 14: The controller 3 allows the disk apparatus to move to the first save mode 7 if no command is inputt from the host computer 2 after the prescribed time has elapsed.

Step 15: When the host computer 2 inputs a command to the controller 3 in the first save mode 7, the disk apparatus moves to Step 6.

Step 16: The disk apparatus in the first save mode 7 moves to Step 17 if 60 or more seconds elapse without any command from the host computer 2 being given to the controller 3.

Step 17: When the prescribed time (60 seconds) elapses without any command being inputt to the controller 3, the controller 3 allows the disk apparatus to move to the second save mode 8 where the tracking and focusing servomechanism are on standby, but the disk motor 12 rotates to turn only the disk 1.

Step 18: When a command is inputt in the controller 3 from the host computer 2, the disk apparatus moves to Step 6. If the next command is a stop command or an eject command, the controller 3 controls the disk apparatus accordingly.

Figure 4:
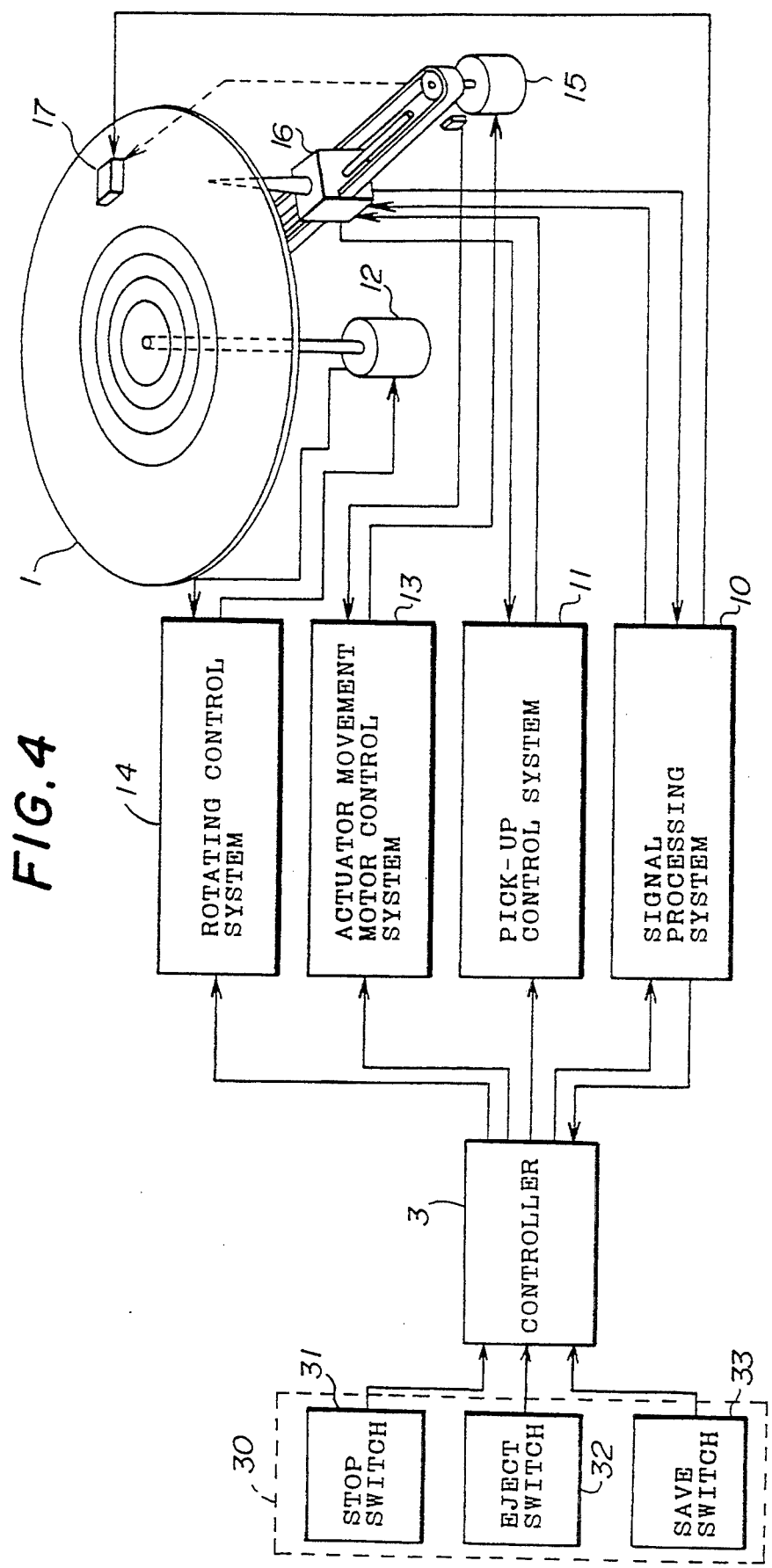
FIG. 4 a block diagram of a configuration of a second embodiment of the present invention.

FIG. 4 is a block diagram of a second embodiment of the present invention. Commands are given from the host computer 2 by way of the controller 3 as described above in the first embodiment, but in the present embodiment the host computer 2 is replaced with a group of switches 30 such as a stop switch 31, an eject switch 32, and a save switch 33. The controller 3 controls the disk apparatus to shift it from one mode to another when it receives a corresponding control signal from the switch group 30.

As described above, the present invention provides a disk apparatus which is controlled according to the commands from the host computer 2 or by the switches 30 to stop any unnecessary function and to move to a save mode having lower power consumption and less heat generation than in the prior art.

Further, the present invention is not limited to the above described embodiments, but various variations and modification may be made without departing from the scope of the invention.

What is claimed is:

1. A disk apparatus having a first motor for rotating a data storage disk, a pickup, and a second motor for moving the pickup in radial directions with respect to said disk, and a command input device for inputting commands by a user, said disk apparatus having an operation mode for executing a command received from said command input device and an idle mode in which there is no signal processing for recording data on said disk, no recording, no signal processing of signals detected from said disk, and no reproduction of data but in said idle mode disk rotation and a focusing/tracking function to control focusing/tracking by a focusing/tracking control signal generated from a detected signal from said disk are performed, said disk apparatus further comprising:

a controller for receiving commands from said command input device and controlling operation of said disk apparatus including placing the apparatus in the operation and idle modes;

rotation control means, coupled to said controller, for controlling the first motor;

pickup motor control means, coupled to said controller, for controlling the second motor;

pickup control means, coupled to said controller, for controlling a focusing operation and a tracking operation of said pickup; and signal processing means, coupled to said controller, for processing a recording signal to be recorded on said disk and a reproduced signal read out therefrom;

said controller comprising command judging means for judging that there is no input of a command from said command input device within a predetermined period of time when said apparatus is in said idle mode, mode displace means which executes inputted commands and changes the operative modes of the apparatus in accordance with said commands, and function stop means for stopping at least one of signal processing means, said rotation control means, said pickup motor control means, and said pickup control means when said command judging means judges that there is no input of a command, thereby to terminate a selected one of a disk rotation, focusing, and predetermined tracking functions of said idle mode.

2. A disk apparatus as claimed in claim 1, wherein said function stop means comprises:

first save mode control means for changing said disk apparatus from said idle mode to a first save mode in which said rotation control means rotates said disk and said pickup control means controls only the focusing operation when no command is received from said command input device during a first period of time.

3. A disk apparatus as claimed in claim 2, wherein: said function stop means comprises means for setting said disk apparatus to an operation mode from said first save mode when a command is received from said command input device while said disk apparatus is in said first save mode; and wherein said controller controls, in said operation mode, said signal processing means, said rotation control means, said pickup motor control means, and said pickup control means in response to said received command.

4. A disk apparatus as claimed in claim 1, wherein said function stop means comprises:

first save mode control means for changing said disk apparatus from said idle mode to a first save mode in which said rotation control means rotates said disk and said pickup control means controls only the focusing operation when no command is received from said command input device during a first period of time; and second save mode control means for changing said disk apparatus from said first save mode to a second save mode in which said pickup control means is stopped and only said rotation control means is operating when no command is received from said command input device during a second period of time in which period said disk apparatus is in the first save mode.

5. A disk apparatus as claimed in claim 4, wherein:

said function stop means comprises means for setting said disk apparatus to an operation mode from said first save mode when a command is received from said command input device while said disk apparatus is in said first save mode; and wherein said controller controls, in said operation mode, said signal processing means, said rotation control means, said pickup motor control means, and said pickup control means in response to said received command.

6. A disk apparatus as claimed in claim 4 wherein:

said function stop means comprises means for setting said disk apparatus to an operation mode from said second save mode when a command is received from said command input device while said disk apparatus is in said second save mode; and wherein said controller controls, in said operation mode, said signal processing means, said rotation control means, said pickup motor control means, and said pickup control means in response to said received command.

7. A disk apparatus as claimed in claim 1, wherein said command input device includes a host computer connected to said disk apparatus.

8. A disk apparatus as claimed in claim 1, further comprising switch means for generating commands to change predetermined operative modes, wherein said switch means corresponds to said command input device.

9. A disk apparatus as claimed in claim 8, wherein said function stop means comprises:

first save mode control means for setting said disk apparatus to a first save mode in which only said rotation control means and said pickup control means are operating when said switch means generates a first predetermined command; and second save mode control means for setting said disk apparatus to a second save mode in which said pickup control means is stopped and only said rotation control means is operating when said switch means generates a second predetermined command.

10. A disk apparatus as claimed in claim 1, wherein said signal processing means includes magnetic field generating means for generating a magnetic field when said recording signal is recorded on said disk.

11. A disk apparatus having a first motor for rotating a disk, a pickup, a second motor for moving the pickup in radial directions with respect to said disk, and a command input device, said disk apparatus having a plurality of operative modes and further comprising:

a controller for receiving commands from said command input device and controlling an entire operation of said disk apparatus;

rotation control means, coupled to said controller, for controlling the first motor;

pickup motor control means, coupled to said controller, for controlling the second motor;

pickup control motor means, coupled to said controller, for controlling a focusing operation and a tracking operation of said pickup; and signal processing means, coupled to said controller, for processing a recording signal to be recorded on said disk and a reproduced signal read out therefrom;

said controller comprising command judging means for judging that there is no input of a command from said command input device within a predetermined period of time when said apparatus is in a predetermined operative mode, mode displace means which executes inputted commands and changes the operative modes of the apparatus in accordance with said commands, and function stop means for stopping at least one of said signal processing means, said rotation control means, said pickup motor control means, and said pickup control means when said command judgment means judges that there is no input of a command, wherein said function stop means comprises first save mode control means for changing said disk apparatus from said predetermined mode to a first save mode in which said rotation control means rotates said disk and said pickup control means controls only the focusing operation when no command is received from said command input device during a first period of time.

12. A disk apparatus as claimed in claim 11, wherein:

said function stop means comprises means for setting said disk apparatus to an operation mode from said first save mode when a command is received from said command input device while said disk apparatus is in said first save mode; and wherein said controller controls, in said operation mode, said signal processing means, said rotation control means, said pickup motor control means, and said pickup control means in response to said received command.

13. A disk apparatus having a first motor for rotating a disk, a pickup, a second motor for moving the pickup in radial directions with respect to said disk, and a command input device, said disk apparatus having a plurality of operative modes and further comprising:

a controller for receiving commands from said command input device and controlling an entire operation of said disk apparatus;

rotation control means, coupled to said controller, for controlling the first motor;

pickup motor control means, coupled to said controller, for controlling the second motor;

pickup control motor means, coupled to said controller, for controlling a focusing operation and a tracking operation of said pickup; and signal processing means, coupled to said controller, for processing a recording signal to be recorded on said disk and a reproduced signal read out therefrom;

said controller comprising command judging means for judging that there is no input of a command from said command input device within a predetermined period of time when said apparatus is in a predetermined operative mode, mode displace means which executes inputted commands and changes the operative modes of the apparatus in accordance with said commands, and function stop means for stopping at least one of said signal processing means, said rotation control means, said pickup motor control means, and said pickup control means when said command judgment means judges that there is no input of a command, wherein said function stop means comprises first save mode control means for changing said disk apparatus from said predetermined mode to a first save mode in which said rotation control means rotates said disk and said pickup control means controls only the focusing operation when no command is received from said command input device during a first period of time; and second save mode control means for changing said disk apparatus from said first save mode to a second save mode in which said pickup control means is stopped and only said rotation control means is operating when no command is received from said command input device during a second period of time in which period said disk apparatus is in the first save mode.

14. A disk apparatus as claimed in claim 13, wherein:
said function stop means comprises means for setting said disk apparatus to an operation mode from said first save mode when a command is received from said command input device while said disk apparatus is in said first save mode; and wherein
said controller controls, in said operation mode, said signal processing means, said rotation control means, said pickup motor control means, and said pickup control means in response to said received command.

15. A disk apparatus as claimed in claim 13, wherein:
said function stop means comprises means for setting said disk apparatus to an operation mode from said second save mode when a command is received from said command input device while said disk apparatus is in said second save mode; and wherein
said controller controls, in said operation mode, said signal processing means, said rotation control means, said pickup motor control means, and said pickup control means in response to said received command.

16. A disk apparatus having a first motor for rotating a disk, a pickup, a second motor for moving the pickup in radial directions with respect to said disk, and a command input device, said disk apparatus having a plurality of operative modes and further comprising:

a controller for receiving commands from said command input device and controlling an entire operation of said disk apparatus;

rotation control means, coupled to said controller, for controlling the first motor;

pickup motor control means, coupled to said controller, for controlling the second motor;

pickup control means, coupled to said controller, for controlling a focusing operation and a tracking operation of said pickup;

signal processing means, coupled to said controller, for processing a recording signal to be recorded on said disk and a reproduced signal read out therefrom;

said controller comprising command judging means for judging that there is no input of a command from said command input device within a predetermined period of time when said apparatus is in a predetermined operative mode, mode displacing means which executes inputted commands and changes the operative modes of the apparatus in accordance with said commands, and function stop means for stopping at least one of said signal processing means, said rotation control means, said pickup motor control means, and said pickup control means when said command judgment means judges that there is no input of a command;

said command input device comprising switch means for generating commands to change said predetermined operative modes; and wherein said function stop means comprises first save mode control means for setting said disk apparatus to a first save mode in which only said rotation control means and said pickup control means are operating when said switch means generates a first predetermined command; and second save mode control means for setting said disk apparatus to a second save mode in which said pickup control means is stopped and only said rotation control means is operating when said switch means generates a second predetermined command.

* * * * *